Patented Oct. 29, 1946

2,410,040

UNITED STATES PATENT OFFICE 2,410,040

BASIC ALKYL ESTERS AND THEIR SALTS

Frederick F. Blicke, Washtenaw County, Mich., assignor to Regents of the University of Michigan, Ann Arbor, Mich., a corporation of Michigan No Drawing. Application February 26, 1944, Serial No. 524,083

6 Claims. (Cl. 260—469)

The present invention is directed to certain novel basic-alkyl esters of para-xenyl-acetic acid and para-xenyl-acetic acids substituted with a hydrocarbon radical on the alpha carbon atom and salts thereof, and is particularly concerned with (a) esters having the formula

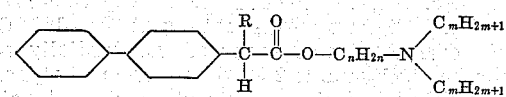

wherein R represents hydrocarbon or hydrogen, $n$ is an integer from 2 to 4, inclusive, and $m$ is an integer from 1 to 4, inclusive, and (b) the acid salts of such basic-alkyl esters. Among the hydrocarbon radicals represented by "R" are lower-alkyl, aryl, cycloalkyl, and aralkyl. Members of this class of compounds have been prepared and found to have value as antispasmodics and as intermediates in the preparation of more complex organic derivatives. These free basic-alkyl esters of para-xenyl-acetic and substituted acetic acids are commonly obtained as oily liquids readily soluble in many common organic solvents, difficultly soluble in water, and distilling with some decomposition at high temperatures and under reduced pressure. The acid salts of these basic-alkyl esters are generally solids at ordinary temperatures.

The compounds may be prepared by reacting a suitable acid, e. g. para-xenyl-acetic acid, alpha-(para-xenyl)-phenylacetic acid, alpha-(para-xenyl)-phenylpropionic acid, alpha-(para-xenyl)-cyclohexylacetic acid, or alpha-(para-xenyl)-normalbutyric acid with a suitable dialkylamino-alkyl halide. This is conveniently accomplished by heating substantially equimolecular proportions of the acid and halide together, preferably in the presence of a low boiling organic solvent, e. g. isopropyl alcohol, butyl alcohol, benzene, etc., and thereafter evaporating the solvent under reduced pressure, and fractionally recrystallizing the residue from a suitable solvent or solvent mixture. This procedure is productive of the hydrohalide of the dialkyl-amino-alkyl ester of the acid selected. The free ester may be obtained by treatment of this hydrohalide product with ammonia or other suitable alkaline material. Acid salts other than the hydrohalides may be prepared from the basic-alkyl esters by reaction with the corresponding anhydrous acid or by treatment of the hydrohalide with a selected salt of the desired acid to bring about double decomposition, but under such conditions as not to induce hydrolysis of the ester.

An alternate method for the preparation consists of reacting thionyl chloride with a selected para-xenyl-acetic or hydrocarbon substituted acetic acid to produce the corresponding acid chloride. The latter compound is reacted with an excess of a suitable dialkylamino-alkanol in an inert solvent, e. g. benzene. This is conveniently carried out by heating the mixture to the boiling temperature of the solvent and under reflux for the period of time necessary to accomplish the reaction. Dialkylamino-alkanol hydrochloride separates from the mixture and is recovered by filtration. The filtrate from this operation may be evaporated under reduced pressure to separate the solvent and obtain the free basic-alkyl ester of the para-xenyl-substituted acid. An alternate procedure comprises diluting the filtrate with a low boiling non-polar solvent such as diethyl ether and passing gaseous hydrogen halide therethrough to precipitate the basic-alkyl ester hydrohalide which may be separated and recrystallized. Where it is desired to produce salts other than the hydrohalides, the free basic-alkyl ester or the benzene solution thereof may be reacted with a suitable free acid, such as acetic acid, sulfuric acid, methyl-sulfuric acid, etc. The resulting salt compounds may be purified by recrystallization from alcohol and ether mixtures or other suitable solvent therefor.

The preferred embodiment of the invention consists of the hydrochlorides of the basic-alkyl esters formed according to the above methods. These compounds have the generic formula

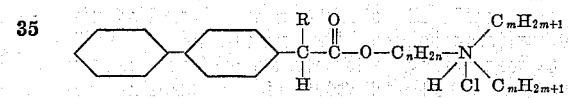

wherein R, $n$ and $m$ have the values heretofore given. These hydrochlorides are relatively high melting crystalline solids somewhat soluble in most organic solvents and soluble in water.

The para-xenyl-acetic acid and substituted acetic acids employed as reactants in the preparation of the compounds of the present invention are crystalline compounds of relatively high melting point. These acids may be synthesized by a number of different methods. Representative methods of preparation are set forth in the Journal of the American Chemical Society, volume 65, pages 1725–1727. Para-xenyl-acetic acid has a melting point of 161°–162° C. Alpha-(para-xenyl)-phenylacetic acid melts at 168°–170° C. Alpha-(para-xenyl)-cyclohexylacetic acid melts at 202°–203° C. Alpha-(para-xenyl)-propionic acid melts at 168°–169° C. Alpha-(para-xenyl)-normalbutyric acid melts at 175°–177° C. Alpha-(para-xenyl)-normalpentanoic acid melts at 142°–143° C. Alpha-(para-xenyl)-normalhexanoic acid melts at 178°–179° C. The omega-dialkylamino-alkyl chlorides and omega-dialkylamino-alkanols employed in the preparation of the new compounds are known derivatives.

The following examples illustrate the invention with respect to the preparation of certain of the basic-alkyl esters and their salts but are not to be construed as limiting:

Example 1

3.18 grams (0.0150 mole) of para-xenyl-acetic acid, 2.05 grams (0.0151 mole) of beta-diethylamino-ethyl chloride, and 75 milliliters of anhydrous isopropyl alcohol were mixed together and the mixture heated to boiling temperature and under reflux for 12 hours. The isopropyl alcohol was then recovered by evaporation of the mixture under reduced pressure, and the residue washed with dry ether and recrystallized from a mixture of diethyl ether and absolute ethanol. From this reaction, there was obtained 2.58 grams of beta-diethylamino-ethyl para-xenyl-acetate hydrochloride as a crystalline compound melting at 158°–159° C.

Example 2

6 grams of alpha-(para-xenyl)-phenylacetic acid and 8 milliliters of thionyl chloride were mixed together and heated to a boiling temperature and under reflux for 1 hour. The excess thionyl chloride was then distilled off under reduced pressure and several 40 milliliter portions of dry benzene added to the residue and distilled out to insure the removal of all traces of thionyl chloride. The residue from this operation was cooled and recrystallized from petroleum ether to obtain alpha-(para-xenyl)-phenylacetyl chloride as a crystalline compound melting at 99°–101° C. 2.6 grams (0.0085 mole) of this product was dissolved in 30 milliliters of dry benzene and the solution added portionwise and with agitation to a solution of 6.0 grams (0.051 mole) of beta-diethylamino-ethyl alcohol in 10 milliliters of benzene. The resulting mixture was heated to boiling temperature and under reflux for ½ hour, cooled, and precipitated beta-diethylamino-ethyl alcohol hydrochloride removed by filtration. A portion of the filtrate was warmed to evaporate off the benzene and obtain beta-diethylamino-ethyl alpha-(para-xenyl)-phenylacetate as a viscous oil difficultly soluble in water and of high boiling temperature. The remainder of the filtrate was washed with water, and the benzene layer separated and dried with magnesium sulfate. The dried benzene solution was then diluted with twice its volume of anhydrous diethyl ether, and hydrogen chloride passed therethrough. A hydrohalide product separated and was recrystallized from a mixture of alcohol and diethyl ether to obtain 2.3 grams of beta-diethylamino-ethyl alpha-(para-xenyl)-phenylacetate hydrochloride as colorless needles melting at 139°–141° C.

Example 3

By substituting other suitable reactants for those shown in the preceding examples, closely related compounds have been prepared. The following are representative:

Gamma-diethylamino-propyl para-xenyl-acetate hydrochloride melting at 113°–115° C. This compound was prepared from para-xenyl-acetic acid and gamma-diethylamino-propyl chloride.

Beta-dibutylamino-ethyl alpha-(para-xenyl)-phenyl-acetate hydrochloride melting at 128°–130° C. This compound was prepared from alpha-(para-xenyl)-phenylacetic acid and beta-dibutylamino-ethyl chloride.

Gamma - diethylamino - propyl alpha - (para-xenyl)-phenylacetate hydrochloride melting at 117°–119° C. This compound was prepared by reacting together alpha-(para-xenyl)-phenylacetic acid and gamma-diethylamino-propyl chloride.

Beta-diethylamino-ethyl alpha-(para-xenyl)-cyclo-hexylacetate hydrochloride melting at 170°–172° C. This compound was prepared by reacting together alpha-(para-xenyl)-cyclohexylacetyl chloride and beta-diethylamino-ethanol to form the free basic-alkyl ester, and passing gaseous hydrogen chloride in contact with a benzene solution of the ester.

Gamma - diethylamino - propyl alpha - (para-xenyl)-cyclohexylacetate hydrochloride melting at 149°–151° C. This compound was prepared by reacting together alpha-(para-xenyl)-cyclohexylacetic acid and gamma-diethylamino-propyl chloride.

Beta-diethylamino-ethyl alpha-(para-xenyl)-propionate hydrochloride melting at 141°–143° C. This compound was prepared substantially as described in Example 2 by the reaction of alpha-(para-xenyl)-propionyl chloride with beta-diethylamino-ethanol to form the free basic-alkyl ester, and reaction of this ester with hydrogen chloride.

Gamma - diethylamino - propyl alpha - (para-xenyl)-propionate hydrochloride melting at 112°–114° C. This salt compound was prepared substantially according to the method of Example 1 by reacting together alpha-(para-xenyl)-propionic acid and gamma-diethylamino-propyl chloride.

Beta-diethylamino-ethyl alpha-(para-xenyl)-normal-butyrate hydrochloride melting at 154°–156° C. This compound was prepared according to the method of Example 2 by reacting together alpha-(para-xenyl)-normalbutyryl chloride and beta-diethylamino-ethanol to form the free basic-alkyl ester, and reacting this ester with gaseous hydrogen chloride.

Gamma - diethylamino - propyl alpha - (para-xenyl)-normalbutyrate hydrochloride melting at 97°–99° C. This compound was prepared by reacting together alpha-(para-xenyl)-normalbutyric acid and gamma-diethylamino-propyl chloride.

Beta-diethylamino-ethyl alpha-(para-xenyl)-normal-pentanoate hydrochloride melting at 122°–124° C. This compound was prepared according to the method of Example 2 by the reaction of alpha-(para-xenyl)-pentanoyl chloride and beta-diethylamino-ethanol to produce the free basic-alkyl ester, and the reaction of the latter with gaseous hydrogen chloride.

Gamma - diethylamino - propyl alpha-(para-xenyl)-normalpentanoate hydrochloride melting at 100°–102° C. This compound was prepared according to the method of Example 1 by reacting together alpha-(para-xenyl)-normalpentanoic acid and gamma-diethylamino-propyl chloride.

In a similar fashion alpha-(para-xenyl)-normalhexanoic acid or alpha-(para-xenyl)-normalhexanoyl chloride may be reacted with omega-dialkylamino-alkyl halides or omega-dialkylamino-alkanols to obtain such compounds as beta - diethylamino-ethyl alpha-(para-xenyl)-normalhexanoate and its hydrochloride or beta-dibutylamino - ethyl alpha-(para-xenyl)- normalhexanoate and its hydrochloride. By substituting other omega-dialkylamino-alkanols and omega - dialkylamino-alkyl halides for those shown in the foregoing examples, such compounds as the dimethylamino-ethyl ester of alpha-methyl-para-xenyl acetic acid (dimethyl-ethyl-alpha-(para-xenyl)-propionate), gamma-dipropylamino-propyl alpha-(para-xenyl)-propionate and its hydrochloride, delta-diethylamino - normalbutyl alpha-(para-xenyl)-cyclohexylacetate and its hydrochloride, beta-dipropylamino-ethyl alpha-(para-xenyl)- phenylacetate and its hydrochloride, etc., may be formed. Other salts which may be prepared by reacting the free basic-alkyl esters obtained according to the method of Example 2 with suitable acids include beta-diethylamino-ethyl para-xenyl - acetate hydrobromide, gamma-diethylamino-propyl alpha-(para-xenyl)-phenylacetate metho - sulfate, gamma - diethylamino - propyl alpha-(para-xenyl)-propionate neutral sulfate, beta - diethylamino-ethyl alpha-(para-xenyl)-phenylpropionate tartrate, delta-dibutylamino-normalbutyl alpha-(para-xenyl)-propionate hydroiodide, beta - diethylamino - propyl alpha-(para - xenyl)-hexenoate-delta-4-hydrochloride, etc.

Especially preferred embodiments of the present invention are the omega-dialkylamino-alkyl alpha-(para-xenyl)-propionates and normal-butyrates and particularly the hydrochlorides thereof. While all of the compounds herein disclosed are adapted to be employed as active constituents of antispasmodic compositions, the indicated propionate and butyrate derivatives have been found to be exceptionally effective. Representative of the results obtained with these derivatives is the effect exerted upon isolated rabbit jejunum according to the technique of Magnus. Thus, beta - diethylamino-ethyl alpha-(para-xenyl)-propionate hydrochloride at a dilution of between 1 to 1,000,000 and 1 to 2,000,000 in water was effective in relaxing the unstimulated jejunal segment. Gamma - diethylamino-propyl alpha-(para-xenyl)-propionate hydrochloride was effective at a similar dilution. Beta-diethylamino-ethyl alpha-(para-xenyl)-butyrate hydrochloride was effective at a dilution of 1 to 1,000,000.

I claim:

1. A compound selected from the group consisting of (a) basic-alkyl esters of the formula

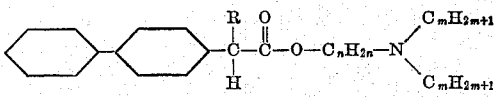

wherein R is selected from the group consisting of hydrogen and hydrocarbon radicals, $n$ is an integer from 2 to 4, inclusive, and $m$ is an integer from 1 to 4, inclusive, and (b) acid salts thereof.

2. A compound having the formula

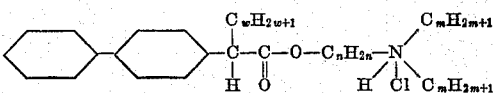

wherein $w$ represents an integer from 1 to 4, inclusive, $n$ is an integer from 2 to 4, inclusive, and $m$ is an integer from 1 to 4, inclusive.

3. A compound having the formula

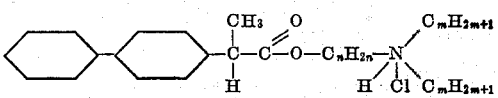

wherein $n$ is an integer from 2 to 4, inclusive, and $m$ is an integer from 1 to 4, inclusive.

4. A compound having the formula

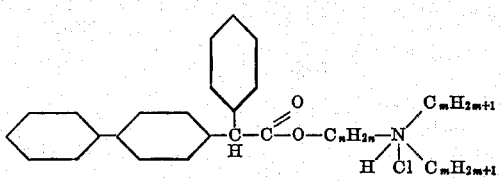

wherein $n$ is an integer from 2 to 4, inclusive, and $m$ is an integer from 1 to 4, inclusive.

5. A compound having the formula

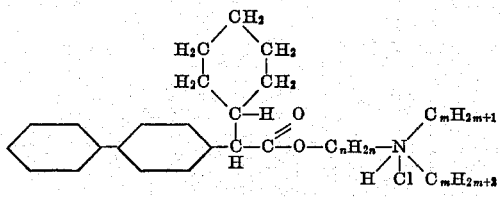

wherein $n$ is an integer from 2 to 4, inclusive, and $m$ is an integer from 1 to 4, inclusive.

6. Beta - diethylamino - ethyl alpha - (para-xenyl) - propionate hydrochloride melting at 141°–143° C.

FREDERICK F. BLICKE.